United States Patent [19]

Brearley et al.

[11] Patent Number: 4,795,219

[45] Date of Patent: Jan. 3, 1989

[54] VEHICLE BRAKING SYSTEM

[75] Inventors: Malcolm Brearley, Solihull; Richard B. Moseley, Birmingham, both of England

[73] Assignee: Lucas Industries public limited company, Birmingham, England

[21] Appl. No.: 56,626

[22] Filed: May 18, 1987

[30] Foreign Application Priority Data

May 17, 1986 [GB] United Kingdom ................ 8612066

[51] Int. Cl.$^4$ .............................. B60T 8/30; B60T 8/58
[52] U.S. Cl. .................................... 303/9.69; 303/22.1; 303/15; 303/100
[58] Field of Search ........................ 188/195; 280/703; 303/6 C, 3, 20, 15, 22 R, 22 A, 100, 9.62, 9.66, 9.69, 22.1

[56] References Cited

U.S. PATENT DOCUMENTS

| | | | |
|---|---|---|---|
| 3,131,975 | 5/1964 | Smith et al. | 303/22 R |
| 3,556,608 | 1/1971 | MacDuff et al. | 303/22 R |
| 4,674,804 | 6/1987 | Burgdorf et al. | 303/22 R X |
| 4,677,557 | 6/1987 | Stumpe | 303/22 R X |
| 4,712,839 | 12/1987 | Brearley et al. | 303/22.1 X |
| 4,743,072 | 5/1988 | Brearley | 303/15 |

FOREIGN PATENT DOCUMENTS 0062246 10/1982 European Pat. Off. .......... 303/22 R
1902944 2/1978 Fed. Rep. of Germany ...... 303/100

Primary Examiner—Andres Kashnikow
Assistant Examiner—Timothy Newholm
Attorney, Agent, or Firm—Scrivener and Clarke

[57] ABSTRACT

A vehicle braking system of the electronically compensated type in which driver demand signals to inner closed loop pressure systems for the front and rear brakes are adjusted in accordance with load signals obtained from load sensors associated with front and rear axles of the vehicle respectively, these load signals themselves being modified to take account of the weight transfer effect from the rear axle to the front axle during braking. Weight transfer is calculated from the expression:

$$\text{Weight transfer} = \text{Vehicle Deceleration} \times \frac{\text{Gross Vehicle Weight} \times \text{Height of centre of gravity}}{\text{Wheel base}}$$

the deceleration, gross vehicle weight, height of the center of gravity of the vehicle and the vehicle wheel base being calculated and stored and manipulated electronically to provide dynamic load apportioning between the various inner closed loop pressure systems controlling the front and rear brakes, respectively.

4 Claims, 3 Drawing Sheets

VEHICLE BRAKING SYSTEM

The present invention relates to vehicle braking systems of the electronically compensated type wherein, instead of the conventional hydraulic or pneumatic control system operating between the foot pedal and the brake actuators, the analysis of data concerning braking parameters, brake demand, vehicle loading, brake efficiency and the like is performed electronically and the brake actuators are controlled electronically in accordance with such analysis.

In such systems, the main sources of braking parameter change are measured and the pressure demands to inner closed loop pressure systems are adjusted by outer open loops to compensate for said parameter changes. One of the basic parameters which is measured in such systems is the vehicle loading (axle loads) and it is with the method of determining the vehicle loading that the present invention is concerned.

In accordance with the present invention, driver demand signals to the inner closed loop pressure systems for the front and rear brakes are adjusted in accordance with load signals obtained from load sensors associated with front and rear axles of the vehicle respectively, these load signals themselves being modified to take account of the weight transfer effect from the rear axle to the front axle during braking.

Weight transfer is calculated from the expression:

$$\text{Weight transfer} = \text{Deceleration} \times \frac{\text{Gross Vehicle Weight} \times \text{Height of Centre of Gravity}}{\text{Wheel base}}$$

the deceleration, gross vehicle weight, height of the centre of gravity of the vehicle and the vehicle wheel base being calculated and stored and manipulated electronically to provide dynamic load apportioning between the various inner closed loop pressure systems controlling the front and rear brakes, respectively.

Advantageously, the axle load measurements are made deliberately to have a long time constant so as to be assured of a good average load figure which has been established during the recent normal (non-braking) operation of the vehicle.

The invention is described further hereinafter, by way of example only, with reference to the accompanying drawings, in which.

The main sources of braking system disturbance in practice are vehicle load and operating gradient, both of which can change suddenly, and brake deterioration which is much more gradual. The sudden changes require compensation by corresponding sudden corrections whilst slow changes can be countered by a gradual adaptation over a time period which can extend into days or weeks depending on vehicle usage.

In a compensated braking system, a foot pedal transducer generates a first signal indicating the braking level desired by the driver and additional sensors measure the vehicle axle loads and the operating gradient. The system makes appropriate open loop corrections to the brake pressure demands being interpreted from the driver pedal input with the aim of restoring the vehicle deceleration to a level which is in proportion to the driver's demand.

Figure 1:
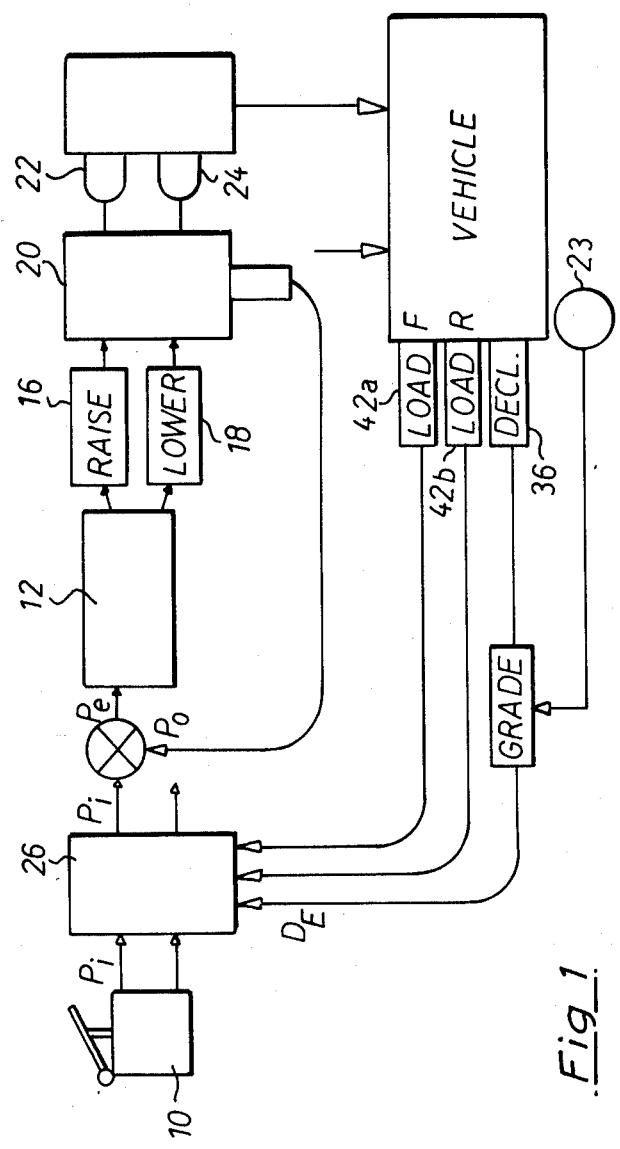
FIG. 1 is a block diagram of a basic electronic control system for operating vehicle brakes.

In FIG. 1 there is shown a pressure control loop taking an input Pi from a brake pedal transducer 10 which is used to provide a pressure error signal Pe by comparison of the input Pi with a pressure transducer output signal Po, this pressure error Pe forming the input to a pressure controller 12 which generates an output signal which causes the pressure developed by an electro-pneumatic or electro-hydraulic converter to change in a direction such as to reduce the amplitude of the pressure error Pe.

The nature and circuit of such a pressure controller 12 depends upon the type of converter employed. Two such converter principles are well known, namely an analogue system in which a valve is employed with pressure output developed proportional to solenoid current and a digital system (as shown) in which a pair of simpler solenoid valves 16,18 is employed to raise or lower a control chamber pressure by selective energisation. One form of pneumatic converter employs a relay valve 20 which responds to this control chamber pressure and which re-balances into the closed condition when the brake pressures in front and rear brake actuators 22,24 become equal to this control pressure. Such a valve has an advantage in that the control chamber pressure responds rapidly to valve opening, giving a fast control loop which is accurate and responsive.

The compensated system of FIG. 1 comprises a number of closed loop controllers (only one shown in FIG. 1) which are separate for each axle or for each wheel and which are supplied with pressure demands by a braking correction sub-system 26 such that front and rear systems may receive different pressure demands for equal braking inputs.

One principal disturbance to braking is caused by gradient and this can be sensed by a comparison between deceleration as sensed by a vehicle decelerometer 36 and similar figures generated from speeds sensed by sensors 23 at the vehicle wheels and differentiated electronically after being combined to form a vehicle reference signal in a manner which is well known in anti-lock systems. The gradient figure generated is a deceleration error DE with a sign which indicates uphill or downhill and which can be added directly to braking demand in the sub-system 26 to achieve appropriate correction of the demand signal Pi.

Another basic parameter which disturbs the braking performance is the vehicle loading and it is known to take axle load readings, generated by suitable transducers on the vehicle, and to use these as correction inputs to the sub-system 26 for modifying the brake demand signals Pi. This is achieved by the use of a (preferably digital) multiplier which forms a suitably scaled product of pedal input demand and axle load measurement to form the actual pressure demand input Pi which is compared with Po to form the error Pe.

It is with the means for determining the vehicle (axle) loading that the present invention is concerned.

It is well known that during braking a weight transfer effect is experienced between the front and rear axles. Thus, when the vehicle is braking in forward motion, the effective axle load on the front axle increases and that on the rear axle decreases. The load apportioning to the brakes must therefore take into account the weight transfer effect experienced during braking.

In a known system, a single load sensor on one axle provides signals indicative of the vehicle axle load. The instantaneous load prevailing at the instant that a braking operation is initiated is stored. The stored reading is then subsequently compared with dynamic load changes established by the load sensor under actual braking and the difference used to establish the degree of load apportioning between the front and rear axles. In this system, in order to allow for variations resulting from suspension movements, it is necessary for the load readings to be averaged over several time-spaced readings. Thus, a rapidly changing response is not possible. Furthermore, load readings taken during braking are inherently of very doubtful quality since, under all but possibly the lightest braking, the braking forces applied are transmitted through axle and suspension components in which the axle load is being sensed.

In the present system, in order to overcome this problem, a mean load measurement is stored as soon as braking is commenced as in the known system but load measurements are not used at all during braking. Instead, in the present system, the effect of weight transfer is calculated continuously using parameters measured or stored outside of a braking operation and utilising the following expression, namely $$\text{Weight transfer } (W) = D \times \frac{GVW \times h}{L}$$

where
D = Vehicle deceleration
GVW = Gross vehicle weight
h = Height of the centre of gravity above the ground surface
L = Vehicle wheel base between its front and rear axles.

The Gross Vehicle Weight is taken from the combined axle load measurements which, as explained below, are stored, the deceleration D of the vehicle is measured during the stopping phase and the height h of the centre of gravity and wheel base L are pre-stored quantities.

The axle load measurements are taken with load transducers ($42a$, $42b$) situated on each axle to be controlled, or by pressure transducers sensing the suspension pressure in air-suspended vehicles, and the signals are fed to the braking correction sub-system 26 via an open loop. However, the axle load measurements are made deliberately to have a long time constant (for example, approximately 4 seconds), so as to be assured of a good average load figure which has been established during the recent normal (non-braking) operation of the vehicle. The reason for establishing the load value during a non-braking period is due to the disturbance of the load transducers which occurs during a braking period, which is caused by brake reaction stresses in the axles and deflection of the suspension components. Thus it is necessary to utilise stored values which are acquired at a recent earlier time for obtaining the appropriate braking correction.

Figure 2:
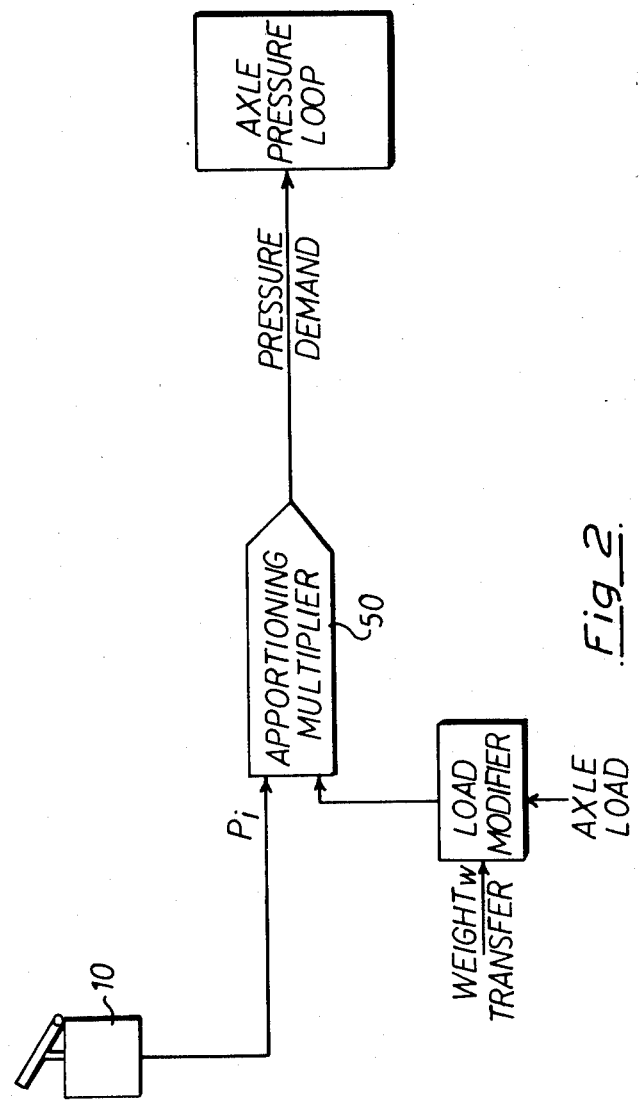
FIG. 2 illustrates how braking compensation is achieved.
Figure 3:
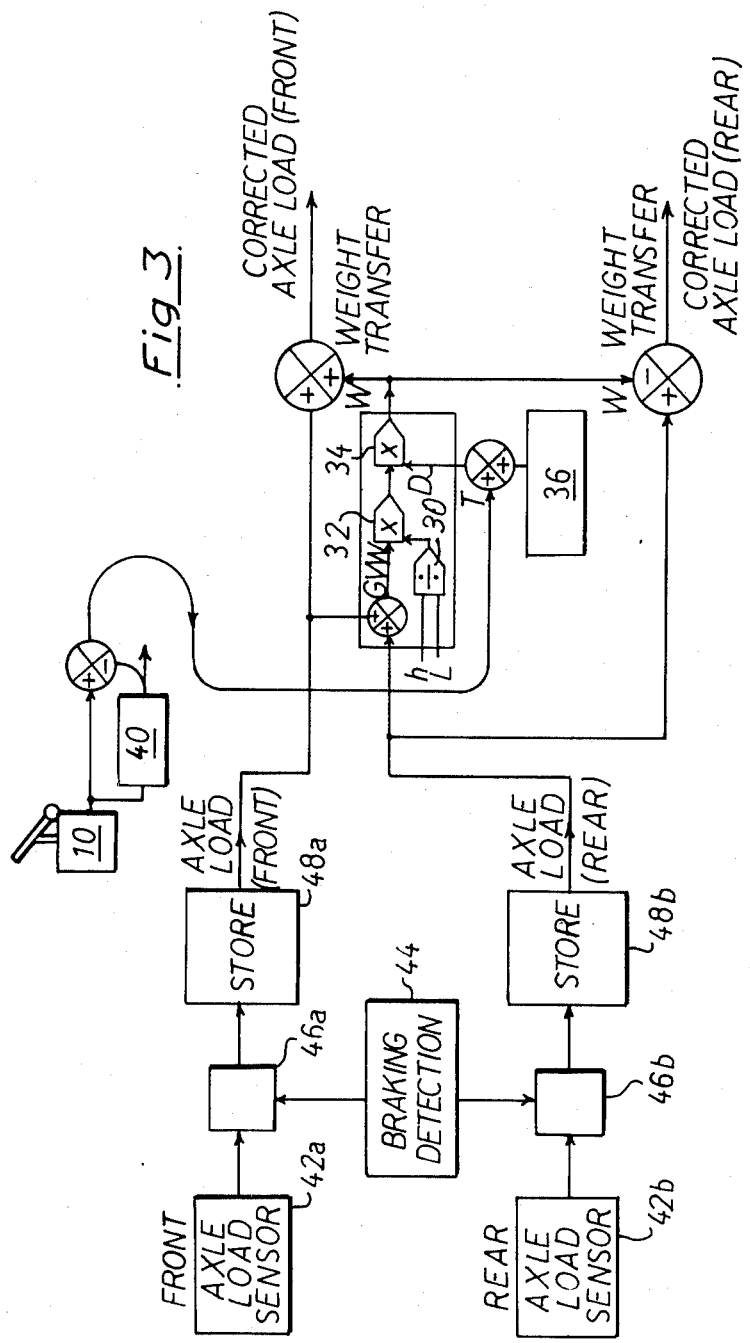
FIG. 3 illustrates one way of achieving dynamic load apportioning in accordance with the present invention.

FIG. 3 shows in further detail one method by which the individual axle load values are processed to give a modified load signal according to the weight transfer effect, the corrected axle load then being used by the apportioning multiplier to act on the driver demand (FIG. 1) to give an apportioned axle demand. Front and rear axle loads are provided by respective sensors $42a$, $42b$ which are designed so as to have a long time constant (e.g. about 4 seconds). Upon detection by a braking detector 44 that a braking operation has been initiated, the actual axle load sensor signals are disabled by gates $46a$, $46b$ and the prevailing load signals stored in respective stores $48a$, $48b$. Thus, the previous mean load measurement occurring over the previous 4 seconds or so is stored as soon as braking is commenced, the actual load signals occurring during braking not being used at all during braking. Signals corresponding to the fixed parameters h and L are divided in a divider 30 and the quotient is multiplied in a first multiplier 32 by a signal corresponding to the GVW (the combined axle loads) and then in a second multiplier 34 is multiplied by a signal D corresponding to the deceleration, as provided by the vehicle decelerometer 36. The resulting weight transfer quantity W is then added to and subtracted from the signals corresponding to the front and rear axle load signals respectively, to provide corrected axle loads. It is these latter signals that are then used to modify the braking demand signal Pi, as shown diagrammatically in FIG. 2, which illustrates the method of compensation by which the braking correction is effected in the open correction loop of FIG. 1 by means of an apportioning multiplier 50, to give a corrected pressure demand which is fed to the closed pressure control loop.

In some circumstances, it may be found that the height of the centre of gravity, h, will vary in accordance with the load, in which case the value for h will be computed from a base value representing the unladen value for h plus a component which is proportional to the vehicle total load value. This value for h can be assessed for accuracy as follows. If during a braking operation skidding occurs, then both the front and rear axle skid points should occur at the same time for a correctly balanced braking system. However, if skidding occurs only on the front axle, then too much weight transfer allowance has taken place and the value for h can be decremented as an adaptive feature. Conversely, if only rear axle skidding occurs, then insufficient weight transfer allowance has been made and the value of h would be accordingly incremented.

In the system described above where the weight transfer calculation controls the brake apportioning, delays in apportioning can take place because of limitations in the deceleration signal response. This can be countered by producing a transient correction of the deceleration signal D which is derived from the driver braking demand Pi. This is made into a transient signal by the use of a filter 40 (FIG. 3) to form a "Fast Driver Demand minus Filtered Driver Demand" signal T, where the filter has a similar time constant to the deceleration measurmenet. The transient correction T is then added to the measured deceleration from the vehicle decelerometer 36 to produce the effective deceleration D, to give immediate weight transfer figures and rapid apportioning response as the braking becomes effective.

We claim:
1. A vehicle braking system of the electronically compensated type, comprising:
 (a) a brake pedal transducer for providing an electrical demand signal representative of a driver's braking requirement;
 (b) front and rear axle brake actuator means;
 (c) front and rear pressure control channels receiving the driver's demand signal and adapted to actuate said front and rear axle brake actuator means for decelerating the vehicle in accordance with the driver's braking requirement;

(d) first sensor means providing dynamic load signals representative of front and rear axle loads, said load axle signals having a long time constant so as to provide an average load figure which has been established during a period of recent non-braking running of the vehicle;

(e) second sensor means forming a signal representative of vehicle deceleration;

(f) adaptive means disposed between said brake pedal transducer and said front and rear pressure control channels and coupled to said first sensor means for modifying the driver's braking demands applied to the front and rear pressure control channels in dependence upon the vehicle axle load signals;

(g) means for storing electrical signals representative of the height of the vehicle centre of gravity and vehicle wheelbase;

(h) means for detecting when a braking operation is initiated;

(i) means responsive to said braking operation detection means for storing the prevailing load signals from said first sensor means when a braking operation is detected;

(j) means for determining the gross vehicle weight of the vehicle; and (k) means for modifying both front and rear load signals applied to said adaptive means to take account of the weight transfer effect from the rear axle to the front axle which occurs during braking, said load signal modifying means including means which performs electronically a calculation of weight transfer quantity using an expression involving the actual deceleration of said vehicle occurring during braking, the height of the centre of gravity of the vehicle, the vehicle wheel base and the gross vehicle weight as determined by said stored load signals measured over said period of recent non-braking operation of the vehicle, in the following relationship:

$$\text{Weight transfer} = \text{Vehicle Deceleration} \times \frac{\text{Gross Vehicle Weight} \times \text{Height of centre of gravity}}{\text{Wheel base}}.$$

2. A vehicle braking system according to claim 1, further comprising a filter of time constant similar to that of said deceleration sensing means and having an input and an output, said filter input being connected to said brake pedal transducer signal and said filter output being subtracted from said brake pedal transducer signal in a subtractor to provide a transient correction signal for modifying the signal representative of vehicle deceleration from said deceleration sensing means.

3. A vehicle braking system according to claim 1, further comprising means for modifying the stored value of vehicle centre of gravity height by an additional factor determinted from one of gross vehicle weight and rear axle weight, means for detecting whether skidding has occurred simultaneously at both axles and means for selecting the modified value of the centre of gravity height in the event that skidding does not occur substantially simultaneously at both axles.

4. A vehicle braking system of the electronically compensated type, comprising:

(a) a brake pedal transducer for providing an electrical demand signal representative of a driver's braking requirement;

(b) front and rear axle brake actuator means;

(c) front and rear pressure control channels receiving the driver's demand signal and adapted to actuate said front and rear axle brake actuator means for decelerating the vehicle in accordance with the driver's braking requirement;

(d) first sensor means providing dynamic load signals representative of front and rear axle loads, said load axle signals having a long time constant so as to provide an average load figure which has been established during a period of recent non-braking running of the vehicle;

(e) second sensor means forming a signal representative of vehicle deceleration;

(f) adaptive means disposed between said brake pedal transducer and said front and rear pressure control channels and coupled to said first sensor means for modifying the driver's braking demands applied to the front and rear pressure control channels in dependence upon vehicle axle load signals;

(g) means for storing electrical signals representative of the height of the vehicle centre of gravity and vehicle wheelbase;

(h) means for detecting when a braking operation is initiated;

(i) means responsive to said braking operation detection means for storing the prevailing load signals from said first sensor means when a braking operation is detected; and (j) means for modifying both front and rear load signals applied to said adaptive means to take account of the weight transfer effect from the rear axle to the front axle which occurs during braking, said load signal modifying means including:

(k) means for dividing the stored centre of gravity height by the stored wheel base;

(l) means for adding the stored front and rear load signals to achieve the gross vehicle weight;

(m) means for multiplying the output from said dividing means by the gross vehicle weight; and (n) means for multiplying the result obtained from said multiplying means by the vehicle deceleration measured by said vehicle deceleration means to provide a weight transfer quantity and for adding said weight transfer quantity to the stored load signal for the front axle and subtracting said weight transfer quantity from the stored load signal for the rear axle.

* * * * *